(12) United States Patent
Guy

(10) Patent No.: US 8,668,411 B2
(45) Date of Patent: Mar. 11, 2014

(54) CUTTING TOOL AND HOLDER

(75) Inventor: Hanoch Guy, Petach Tikva (IL)

(73) Assignee: Iscar, Ltd., Tefen (IL)

( * ) Notice: Subject to any disclaimer, the term of this patent is extended or adjusted under 35 U.S.C. 154(b) by 109 days.

(21) Appl. No.: 13/362,522

(22) Filed: Jan. 31, 2012

(65) Prior Publication Data

US 2012/0148353 A1 Jun. 14, 2012

Related U.S. Application Data

(63) Continuation-in-part of application No. 12/848,754, filed on Aug. 2, 2010, now Pat. No. 8,449,228.

(30) Foreign Application Priority Data

Sep. 16, 2009 (IL) .......................................... 200980

(51) Int. Cl.
*B23B 31/107* (2006.01)

(52) U.S. Cl.
USPC ................ 408/240; 408/226; 279/71; 279/81

(58) Field of Classification Search
USPC ............ 279/71, 72, 81; 408/240, 239 R, 238, 408/226; 407/102, 106
See application file for complete search history.

(56) References Cited

U.S. PATENT DOCUMENTS

| | | | | |
|---|---|---|---|---|
| 666,511 A | * | 1/1901 | Furbish | 279/81 |
| 1,075,174 A | * | 10/1913 | Wahlstrom | 279/72 |
| 2,667,357 A | * | 1/1954 | Andreasson | 279/81 |
| 3,534,640 A | * | 10/1970 | Macy | 408/226 |
| 3,734,517 A | | 5/1973 | Benjamin | |
| 4,202,557 A | * | 5/1980 | Haussmann et al. | 279/19.5 |
| 4,232,985 A | * | 11/1980 | Nielsen | 408/226 |
| 4,563,116 A | * | 1/1986 | Edens | 409/136 |
| 5,005,843 A | * | 4/1991 | Markle et al. | 279/29 |
| 5,542,797 A | * | 8/1996 | Obermeier | 408/226 |
| 5,577,743 A | | 11/1996 | Kanaan et al. | |

(Continued)

FOREIGN PATENT DOCUMENTS

| | | |
|---|---|---|
| DE | 102007062499 A1 * | 7/2009 |
| EP | 0 385 280 B1 | 1/1995 |

(Continued)

OTHER PUBLICATIONS

International Search Report in PCT/IL2010/000573, filed Mar. 12, 2010.

*Primary Examiner* — Andrea Wellington
*Assistant Examiner* — Nicole N Ramos
(74) *Attorney, Agent, or Firm* — Womble Carlyle

(57) ABSTRACT

A cutting tool has a cutting insert and a holder. The cutting insert has a cutting portion and an insert shank with a cylindrical portion and a non-cylindrical portion. The holder has a clamping portion which has a clamping sleeve and a cage located therein. The cage includes a load member housing with a load member. The cage has a major abutment wall adjacent to a minor abutment wall. The clamping sleeve has first and second inner sections defined by points $P_1$ and $P_2$. A point $P_3$ divides the second inner section into first and second portions. The clamping sleeve is rotatable between a secured and a released position of the cutting tool. In the secured position, the non-cylindrical portion abuts the major abutment wall, the cylindrical portion abuts both the minor abutment wall and the load member, and the load member abuts the first portion.

33 Claims, 8 Drawing Sheets

(56) References Cited

U.S. PATENT DOCUMENTS

| | | |
|---|---|---|
| 5,788,430 A | 8/1998 | Meyen et al. |
| 5,807,040 A | 9/1998 | Bongers-Ambrosius et al. |
| 5,868,209 A * | 2/1999 | Wierspecker et al. ........ 173/213 |
| 6,726,222 B2 | 4/2004 | Rohm et al. |
| 7,112,020 B2 * | 9/2006 | Sheffler et al. ................ 409/234 |
| 7,648,315 B2 * | 1/2010 | Omi et al. ...................... 408/57 |
| 8,020,876 B2 | 9/2011 | Lin |
| 2005/0285355 A1 * | 12/2005 | Lin ................................ 279/81 |
| 2007/0296162 A1 | 12/2007 | Guy |
| 2009/0110500 A1 | 4/2009 | Miller et al. |

FOREIGN PATENT DOCUMENTS

| | | |
|---|---|---|
| GB | 2228695 A | 9/1990 |
| JP | 63-306848 | 12/1988 |
| JP | 2002-018613 | 1/2002 |

* cited by examiner

CUTTING TOOL AND HOLDER

RELATED APPLICATIONS

This is a Continuation-in-Part of U.S. patent application Ser. No. 12/848,754, filed Aug. 2, 2010, now U.S. Pat. No. 8,449,228. The contents of the aforementioned application are incorporated by reference in their entirety.

FIELD OF THE INVENTION

The present invention relates generally to metal cutting tools. Specifically, it relates to replaceable cutting inserts having an elongated and generally cylindrical shank, accurately securable in the cutting tools.

BACKGROUND OF THE INVENTION

In this field there are known several methods of clamping a generally cylindrical shank into the clamping portion of a cutting tool. One method makes use of a conical collet and a sleeve, thread rotated around the collet to reduce its diameter, thereby clamping the shank of the cutting insert. This clamping method has a disadvantage in that after the cutting insert is replaced, it is difficult to position the new cutting insert in the exact original orientation of the old cutting insert. Repeatability of the orientation of a cutting insert is a very important feature when it comes to machining, for example, small internal bores. The slightest deviation in the orientation or position of the shank end is magnified at the cutting portion end, most likely resulting in a faulty surface finish.

In EP 0385280 an internal turning chisel is described to have a hook-ended tool, clampable into a recess located in the chuck portion of the chisel. In this clamping method, a clamp screw is threaded into the chuck, pressing against the shank portion of the hook-ended tool which is located within the recess. Consequently, the shank portion is pressed against the other side of the chuck, with respect to the clamp screw. Although this method is better than the collet method in terms of repeatability, it has certain disadvantages. For one, the clamp screw applies force to a single point at one end of the hook-ended tool. Therefore, the force is applied asymmetrically with respect to the tool's longitudinal axis. Another aspect of this method is that, as with most types of screws, there is a limit to the amount of torque the screw can sustain and consequently apply on the shank. Therefore, without using a special torque-limiting tool, plastic deformation may develop in the threads of either the screw or the screw bore. This may prove to be problematic in terms of repeatability. There is yet another aspect which pertains to most clamping methods which require the use of screws. The process of turning a screw is time consuming and for the most part, there is a need for a torque applying tool (e.g. a screwdriver). For example: positioning the screwdriver over the screw head, turning the screwdriver in one direction, replacing the tool and then turning the screw in the other direction.

SUMMARY OF THE INVENTION

In accordance with the present invention there is provided a cutting tool comprising a cutting insert and a holder, the holder having a longitudinal holder axis H.

In accordance with some embodiments, the holder comprises a holder shank and a clamping portion. The clamping portion comprises a clamping sleeve and a cage located within the clamping sleeve. The clamping sleeve has a longitudinal sleeve axis S defining a releasing direction D, the cage comprising at least one load member housing having a load member accommodated therein. The cage having inner and outer cage surfaces, the inner cage surface comprising a major abutment wall adjacent to a minor abutment wall, the major abutment wall forming an angle $\alpha \leq 90°$ with a plane T tangent to the minor abutment wall. The inner cage surface further comprises a stopper wall perpendicular to the minor and major abutment walls, the minor and major abutment walls being parallel to the holder axis H. The clamping sleeve has inner and outer sleeve surfaces, the inner sleeve surface comprising first and second inner sections extending over a given length parallel to the sleeve axis S and defined by points $P_1$ and $P_2$ in a cross section taken perpendicular to the sleeve axis S. A point $P_3$ further from the sleeve axis S than the points $P_1$ and $P_2$ divides the second inner section into first and second portions.

The cutting insert has an insert axis B and comprises an insert shank and a cutting portion, the insert shank having a peripheral surface comprising a cylindrical portion and a non-cylindrical portion, the cutting portion having a cutting tip which includes at least one cutting edge.

The clamping sleeve is rotatable between a secured and a released position of the cutting tool. In the released position the load member is positioned between the second portion and the holder axis H. In the secured position, the load member is positioned between the first portion and the holder axis H, the non-cylindrical portion abuts the major abutment wall, the cylindrical portion abuts both the minor abutment wall and the load member, and the load member abuts the first portion.

In accordance with the present invention, the load member housing comprises a delimiting abutment surface and, in a secured position, the load member abuts both the delimiting abutment surface and the first portion of the clamping sleeve.

In accordance with some embodiments of the present invention, the load member has a cylindrical shape.

In accordance with the present invention, the cage opens out axially forwardly and through the load member housing.

In accordance with some embodiments of the present invention, the outer cage surface has a generally cylindrical shape.

In accordance with the present invention, part of the inner cage surface comprises a surface generally complementary in shape to the cylindrical portion of the insert shank.

In accordance with embodiments of the present invention, the minor abutment wall is flat and perpendicular to the major abutment wall.

In accordance with embodiments of the present invention, the first inner section of the clamping sleeve is cylindrical in shape.

In accordance with the present invention, the first inner section of the clamping sleeve is larger than the second inner section.

In accordance with embodiments of the present invention, the first and second portions have given arc lengths taken in a cross section perpendicular to the sleeve axis S, the arc length of the first portion being longer than the arc length of the second portion.

In accordance with the present invention, when the cutting tool is transferred from a released position to a secured position, the point $P_3$ passes over a farthest portion of the load member from the holder axis H.

In accordance with some embodiments of the present invention there is also provided a holder having a longitudinal holder axis H and comprising:

a holder shank and a clamping portion, the clamping portion comprising a clamping sleeve having a longitudinal sleeve axis S defining a releasing direction D and a cage located within the clamping sleeve, the cage comprising at least one load member housing having a load member accommodated therein, the cage having inner and outer cage surfaces, the inner cage surface comprising a major abutment wall adjacent to a minor abutment wall, the major abutment wall forming an angle α<90° with a plane T tangent to the minor abutment wall; and a stopper wall perpendicular to the minor and major abutment walls, the minor and major abutment walls being parallel to the holder axis H; the clamping sleeve having inner and outer sleeve surfaces, the inner sleeve surface comprising first and second inner sections extending over a given length parallel to the sleeve axis S and defined by points $P_1$ and $P_2$ in a cross section taken perpendicular to the sleeve axis S; a point $P_3$ further from the sleeve axis S than the points $P_1$ and $P_2$ divides the second inner section into first and second portions.

In accordance with some embodiments of the present invention there is further provided a cutting tool comprising a cutting insert and a holder, the holder having a longitudinal holder axis H and comprising a holder shank and a clamping portion, the clamping portion comprising a clamping sleeve and a cage located within the clamping sleeve. The clamping sleeve has a longitudinal sleeve axis S defining a releasing direction.

The cage comprises:

at least one load member housing having a load member accommodated therein, inner and outer cage surfaces, the inner cage surface comprising a stopper wall transverse to the holder axis H, and adjacent minor and major abutment walls, each extending along the holder axis H.

The clamping sleeve has inner and outer sleeve surfaces, the inner sleeve surface comprising first and second inner sections extending over a given length parallel to the sleeve axis S and defined by points P1 and P2 in a cross section taken perpendicular to the sleeve axis S; a point P3 further from the sleeve axis S than the points P1 and P2 divides the second inner section into first and second portions.

The cutting insert has an insert axis B and comprises an insert shank and a cutting portion, the insert shank having a peripheral surface comprising a cylindrical portion and a non-cylindrical portion, the cutting portion having a cutting tip which includes at least one cutting edge;

characterized in that, the clamping sleeve is rotatable between a secured and a released position of the cutting tool;

in the released position the load member is positioned between the second portion (80) and the holder axis H;

in the secured position, the load member is positioned between the first portion and the holder axis H, the non-cylindrical portion abuts the major abutment wall, the cylindrical portion abuts both the minor abutment wall and the load member, and the load member abuts the first portion.

In accordance with some embodiments of the present invention, the major abutment wall is discontinuous.

In accordance with some embodiments of the present invention, the minor abutment wall is discontinuous.

In accordance with some embodiments of the present invention, the cage comprises at least two pins located in respective pin holes in the cage, which open out to the inner and outer cage surfaces.

In accordance with some embodiments of the present invention, the pins have a cylindrical peripheral surface.

In accordance with some embodiments of the present invention, the major abutment wall is constituted by at least two strips.

BRIEF DESCRIPTION OF THE DRAWINGS

For a better understanding of the present invention and to show how the same may be carried out in practice, reference will now be made to the accompanying drawings, in which.

Figure 1:
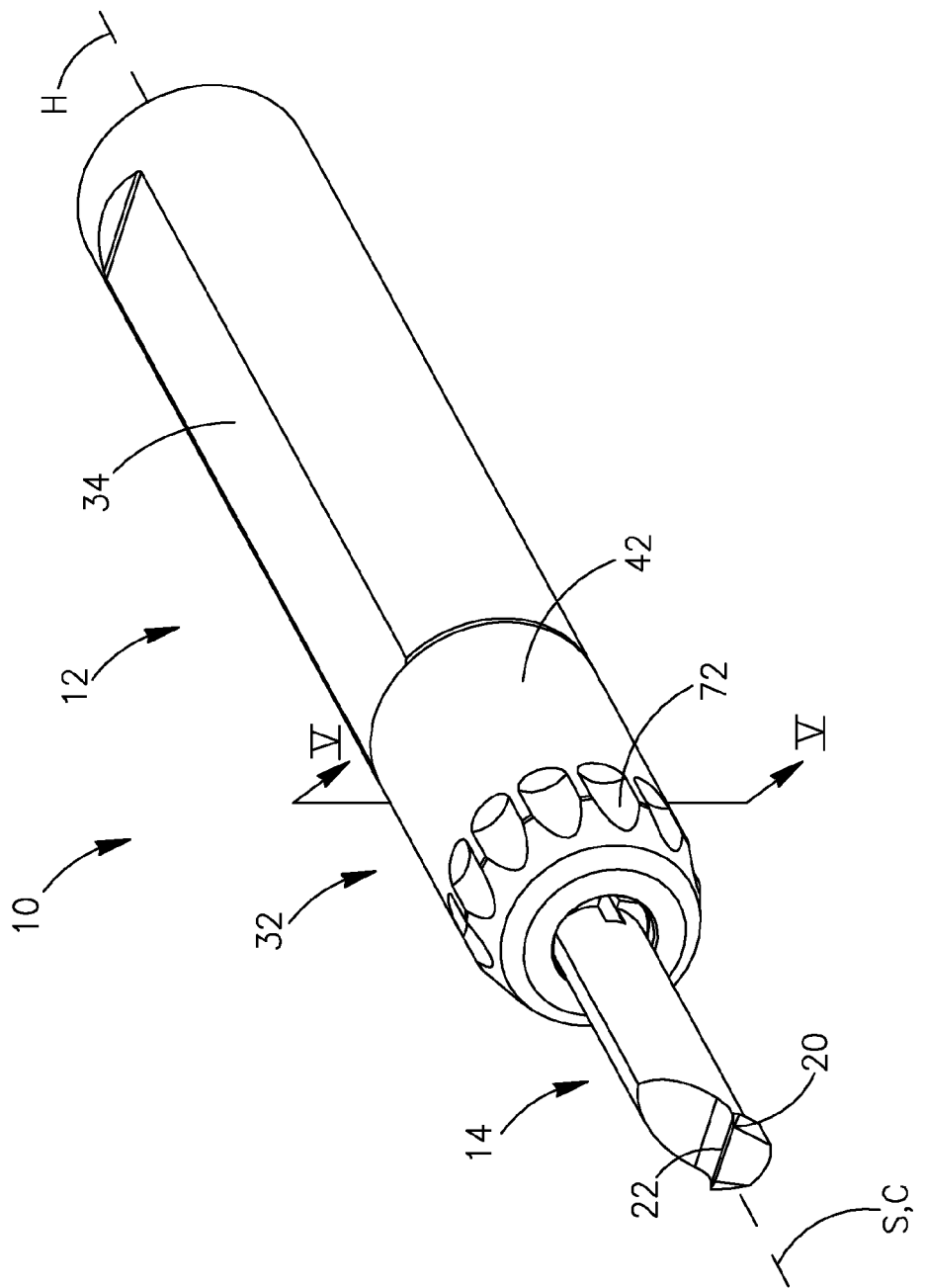
FIG. 1 is an isometric view of a cutting tool according to embodiments of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
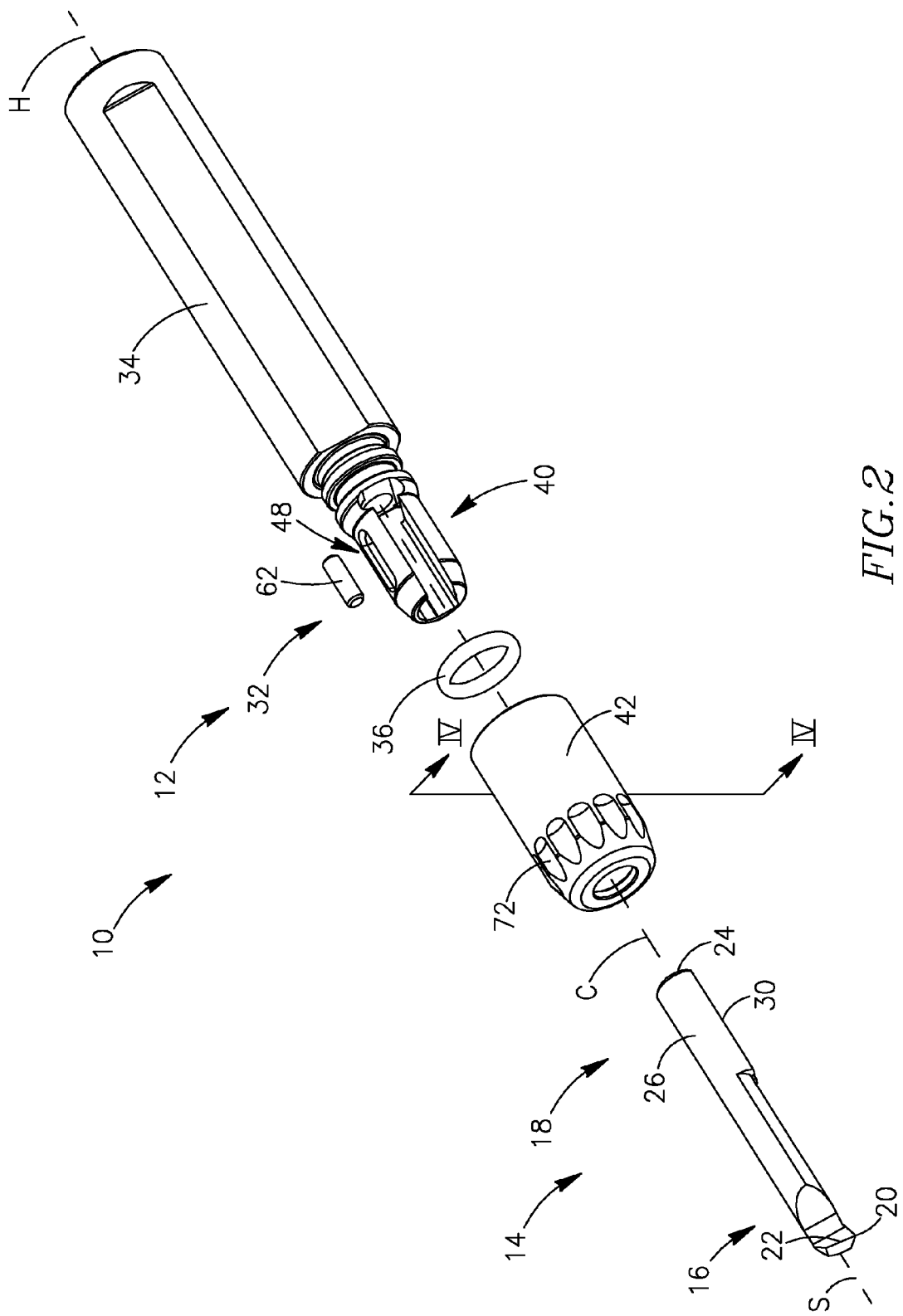
FIG. 2 is an exploded isometric view of the cutting tool of FIG. 1.

Reference is first made to FIGS. 1 and 2, showing respective isometric assembled and exploded views of a cutting tool 10 in accordance with embodiments of the invention. The cutting tool 10 includes a holder 12 and a cutting insert 14 releasably retained in the holder 12.

The cutting insert 14 has a longitudinal insert axis C defining a front-to-rear direction of the cutting insert 14, a cutting portion 16 at a front end of the cutting insert 14 and an insert shank 18 at a rear end of the cutting insert 14. The cutting portion 16 has a cutting tip 20 which includes at least one cutting edge 22. The insert shank 18 has a rear surface 24 and a longitudinally extending peripheral surface 26 extending forwardly from the rear surface 24. The peripheral surface 26 has a cylindrical portion 28 and a non-cylindrical, preferably flat portion 30.

The holder 12 has a holder axis H defining a forward-to-rearward direction of the holder 12, a clamping portion 32 at a forward end of the holder 12 and a holder shank 34 at a rearward end of the holder 12. The clamping portion 32 includes an o-ring 36, a cage 40 and a clamping sleeve 42 capable of elastic deformation. The o-ring 36 functions, firstly, as a sealant preventing spillage of coolant fluid from the clamping portion 32. Secondly, the o-ring 36 provides friction support, preventing the clamping sleeve 42 from becoming accidentally dislodged from the clamping portion 32.

Figure 3:
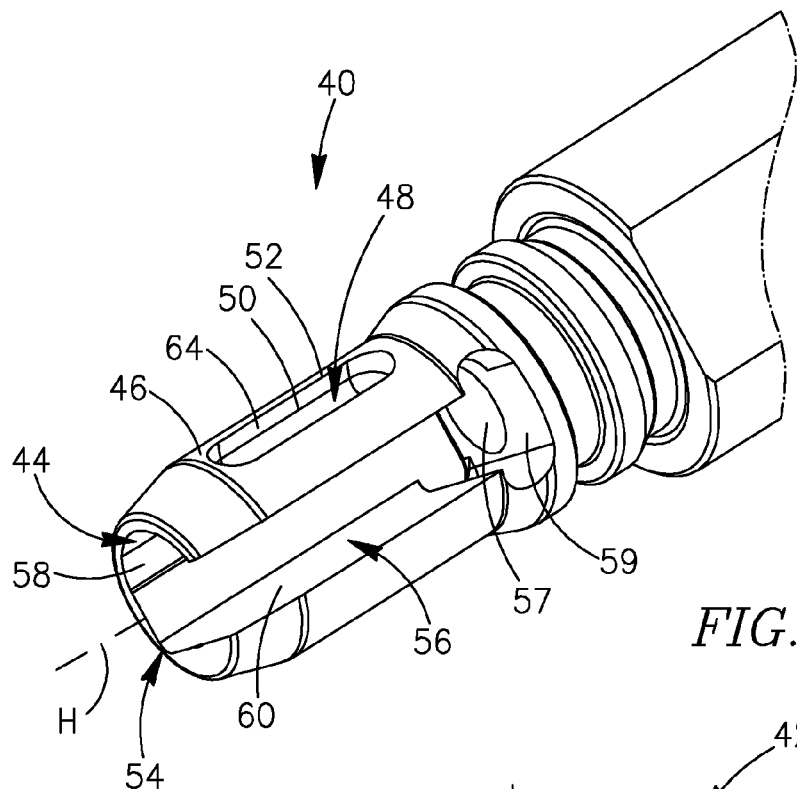
FIG. 3 is an isometric view of a cage seen in FIG. 2 in accordance with embodiments of the present invention.

Reference is now made to FIGS. 3 to 8. FIG. 3 shows an enlarged view of the cage 40. The cage 40 has inner and outer cage surfaces 44, 46 and a load member housing 48 opening out to both the inner and outer cage surfaces 44, 46 through inner and outer openings respectively 50, 52. A part of the inner cage surface 44 comprises a surface generally complementary in shape to the cylindrical portion 28 of the insert shank 18. The cage 40 opens out axially forwardly at a forward cage opening 54, through which the cutting insert 14 may be inserted and withdrawn. The cage 40 opens radially outwardly at a longitudinal cage opening 56 along the length of the cage 40, allowing easy access for machining of the inner cage surface 44. The cage is also provided with a rear aperture 57 formed by a coolant channel (not shown) passing through the holder shank 34, for providing coolant fluid to the cutting insert 14. The cage 40 includes a minor abutment wall 58 and a preferably flat major abutment wall 60. The minor and major abutment walls 58, 60 extend along, and are parallel to, the holder axis H.

In accordance with some embodiments, the major abutment 60 wall forms an angle $\alpha \leq 90°$ with a plane T tangent to the minor abutment wall 58 (see FIG. 7), at a region of contact between the peripheral surface 26 of the insert shank 18 and the minor abutment wall 58. In accordance with some embodiments, the minor abutment wall 58 is flat and the major abutment wall 60 forms an angle $\alpha \leq 90°$ with the minor abutment wall 58 (see FIG. 6).

The major and minor abutment walls 58, 60 are thus adjacent to one another and at least one of them, at least partially, lies on a plane. In accordance with some embodiments, the major abutment wall 60 can be discontinuous.

For example, in the non-limiting example shown in FIGS. 9 to 13, the major abutment wall 60 comprises one or more spaced apart surfaces. In this embodiment, the cage 40 can include two pin holes 61 which can open out to both the inner and outer cage surfaces 44, 46. Each pin hole 61 has a longitudinal pin hole axis $A_H$ oriented transversely to the holder axis H. In this non-limiting example, each pin hole axis $A_H$ is oriented perpendicularly to the holder axis H. The pin hole axes $A_H$ lie in a first major positioning plane $M_{P1}$ which is parallel to the holder axis H. Each pin 63 is located in a respective pin hole 61. Each pin 63 has a pin peripheral surface 65, which may be cylindrical and two pins 62 may be provided with the same radius $R_P$. A second major positioning plane $M_{P2}$ is defined as parallel to the first major positioning plane $M_{P1}$ and is located at a distance equal to the radius $R_P$ therefrom. The second major positioning plane $M_{P2}$ is located between the first major positioning plane $M_{P1}$ and the holder axis H and extends tangentially along both pin peripheral surfaces 65. The major abutment wall 60 lies in the second major positioning plane $M_{P2}$ and, in this non-limiting example, is constituted by two spaced apart and parallely extending contact strips 67. Each contact strip 67 is defined as a portion of the pin peripheral surface 65 which coincides with the second major positioning plane $M_{P2}$. In other words, the major abutment wall 60 is constituted by a contact area defined as that portion of the pin peripheral surfaces 65 which abuts the non-cylindrical portion 30 of the insert shank 18.

It will thus be understood that a major abutment wall 60 can comprise one or more surfaces lying in the second major positioning plane $M_{P2}$. It will also be understood that such surfaces can have different shapes and belong to one or more structures.

Similarly, a minor abutment wall can be discontinuous. To elaborate, it could have one or more surfaces, and such surfaces can have different shapes and belong to one or more structures, much like the major abutment wall.

The inner cage surface 44 has a stopper wall 59 located at a rearward end of the cage 40. The stopper wall 59 may be perpendicular to both the minor and major abutment walls 58, 60. The stopper wall 59 functions as an axial locating means for the cutting insert 14 and the minor and major abutment walls 58, 60 function as positioning means for the cutting insert 14 in a plane perpendicular to the holder axis H, thereby providing for the accurate positioning of the cutting insert 14 and consequently the cutting tip 20.

The load member housing 48 accommodates a load member 62 having a length $L_1$ and has a delimiting surface 64 and a delimiting abutment surface 66 which restrict the tangential movement of the load member 62. In accordance with some embodiments, the load member 62 is cylindrical in shape. In accordance with other embodiments, similar to the embodiment shown in FIGS. 9 to 13, the load member 62 has a non-cylindrical shape. Each containment surface 64, 66 extends from the inner opening 50 to the outer opening 52 and extends longitudinally through the length of the load member housing 48. The inner opening 50 of the load member housing 48 is narrower in width than the diameter of the load member 62, which prevents the load member 62 from passing through the inner opening 50. In accordance with some embodiments the inner opening 50 of the load member housing 48 is shorter in length than the length of the load member 62 which may also prevent the load member 62 from passing through the inner opening 50.

Figure 4:
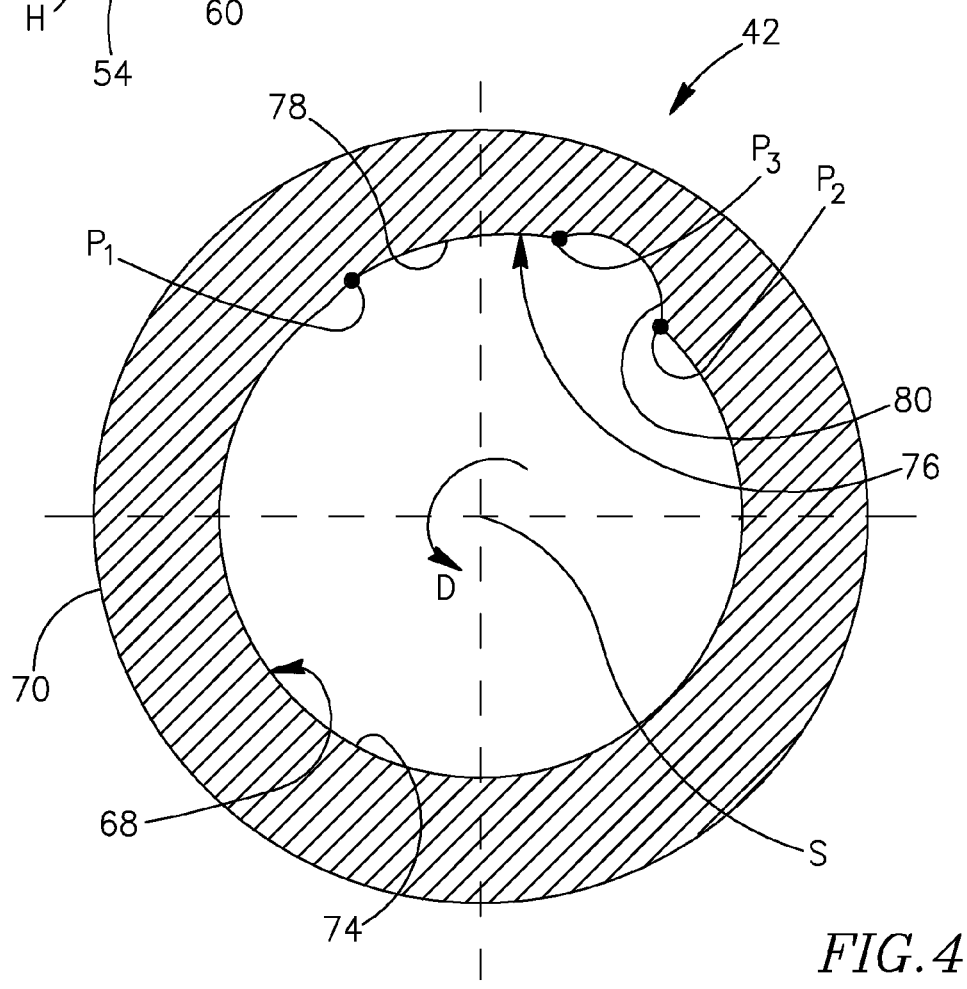
FIG. 4 is a cross-sectional view of the clamping sleeve, taken in a plane indicated by line IV-IV in FIG. 2.

Reference is made to FIG. 4, showing a cross section of the clamping sleeve 42 taken perpendicularly to a longitudinal sleeve axis S which defines a releasing direction D. The clamping sleeve 42 has inner and outer sleeve surfaces 68, 70 extending parallel to the sleeve axis S. The outer sleeve surface 70 has circumferential recesses 72 (see FIG. 2) formed to facilitate torque transfer.

The inner sleeve surface 68 has first and second inner sections 74, 76 extending longitudinally over a given length $L_2 > L_1$. The first and second inner sections 74, 76 are defined by points $P_1$ and $P_2$ in the cross section taken perpendicular to the sleeve axis S. The first inner section 74 is larger than the second inner section 76. The second inner section 76 contains a point $P_3$, which is located further from the sleeve axis S than the points $P_1$ and $P_2$ and which divides the second inner section 76 into first and second portions 78, 80. The first portion 78 has an arc length $P_3$-$P_1$ and the second portion 80 has an arc length $P_2$-$P_3$. The arc lengths are measured in a cross section taken perpendicular to the sleeve axis S in the releasing direction D. The arc length of the first portion 78 is longer than the arc length of the second portion 80 in a cross section taken perpendicular to the sleeve axis S.

Thus, it can be seen from the foregoing that the first inner section 74 follows a cylindrical contour and is connected at circumferentially opposite first and second locations (indicated in the cross-section of FIG. 4 by points $P_1$ and $P_2$) to the second inner section 76, and the second inner section 76 bulges in a radially outward direction and defines an inner sleeve recess 86 in the clamping sleeve 42, the inner sleeve recess 86 having a varying radial dimension and comprising first and second portions 78, 80 which meet at a third location (indicated in the cross-section of FIG. 4 by point $P_3$) on the inner surface that is farther from the sleeve axis (S) than the spaced apart circumferentially opposite first and second locations at which the first and second inner sections are connected.

Figure 5:
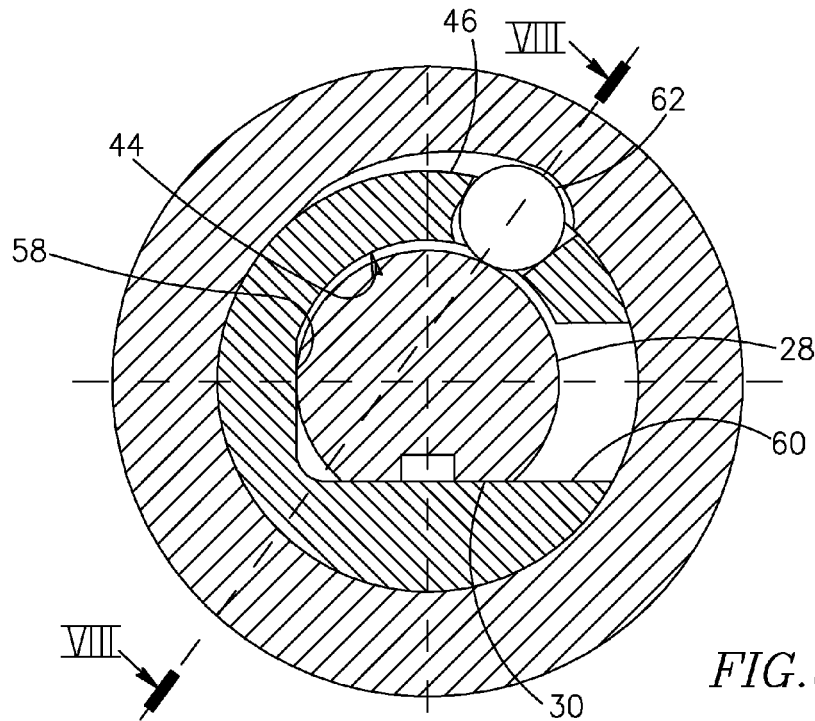
FIG. 5 is a cross-sectional view of the cutting tool in a released position, taken in a plane indicated by line V-V in FIG. 1.
Figure 6:
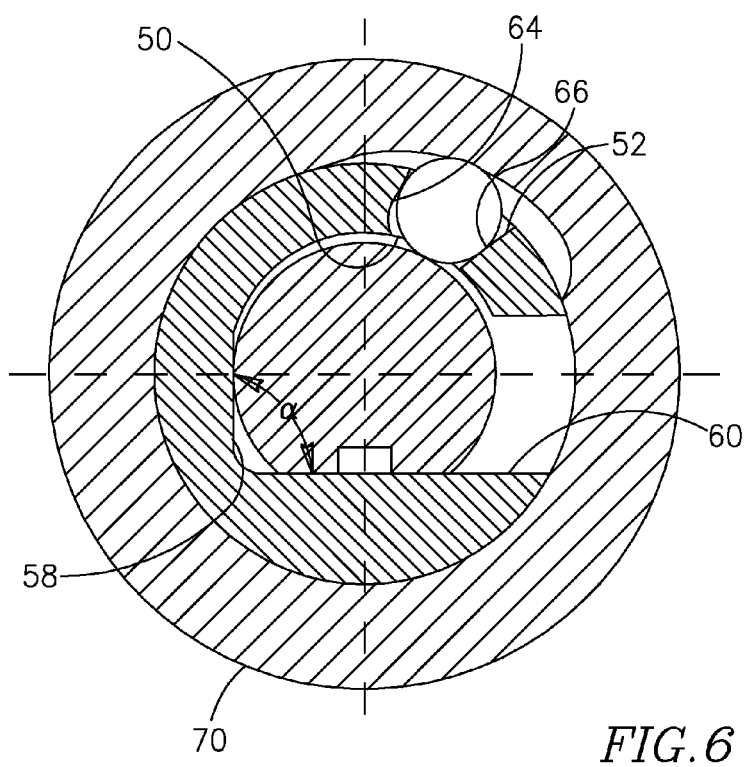
FIG. 6 is a cross-sectional view similar to that shown in FIG. 5 but with the cutting tool in a secured position.
Figure 7:
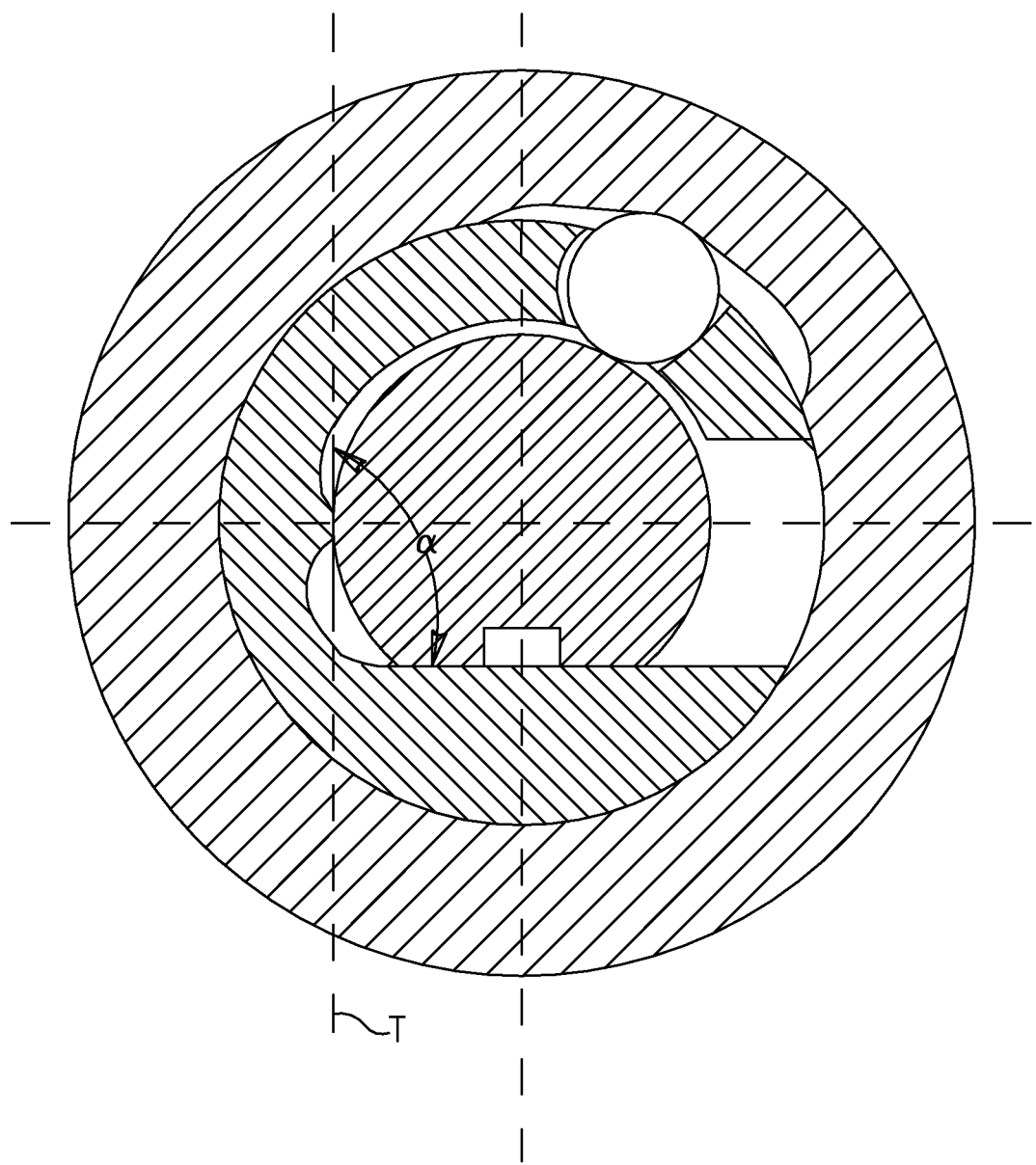
FIG. 7 is a cross-sectional view similar to that shown in FIG. 6 but for another embodiment of the cutting tool.
Figure 8:
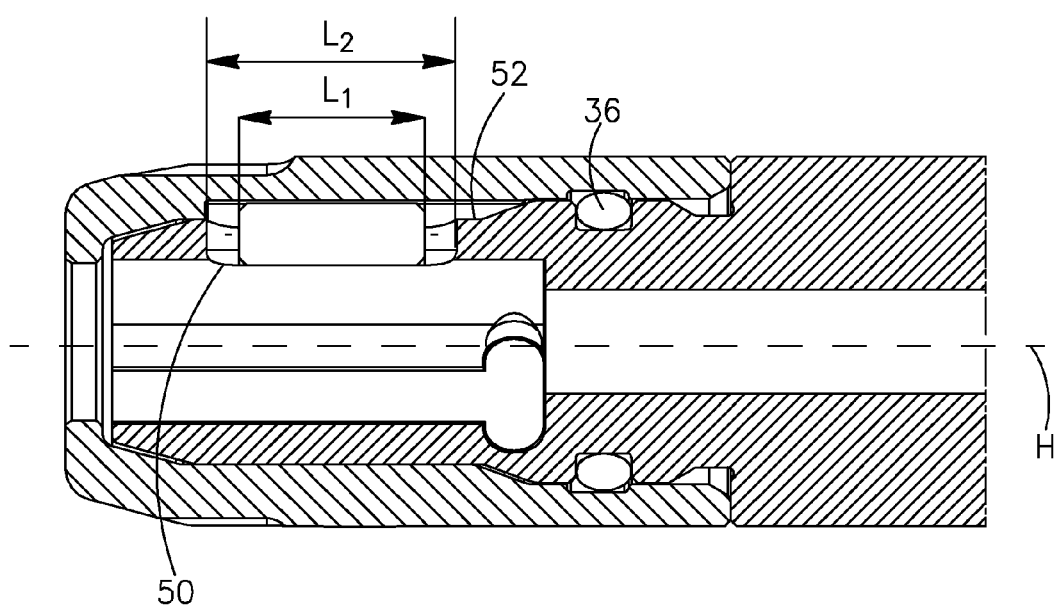
FIG. 8 is a cross-sectional view of the holder taken along line VIII-VIII in FIG. 5 with the cutting insert removed.
Figure 9:
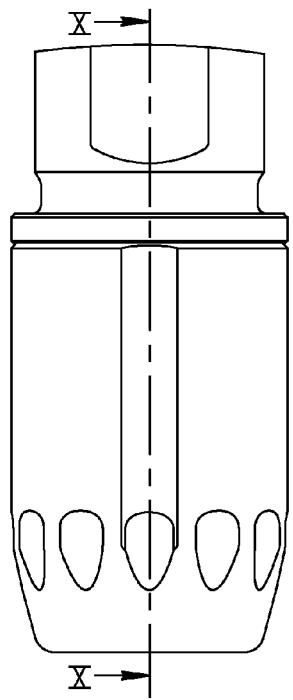
FIG. 9 is a side view of an embodiment of a cutting tool without a cutting insert.
Figure 11:
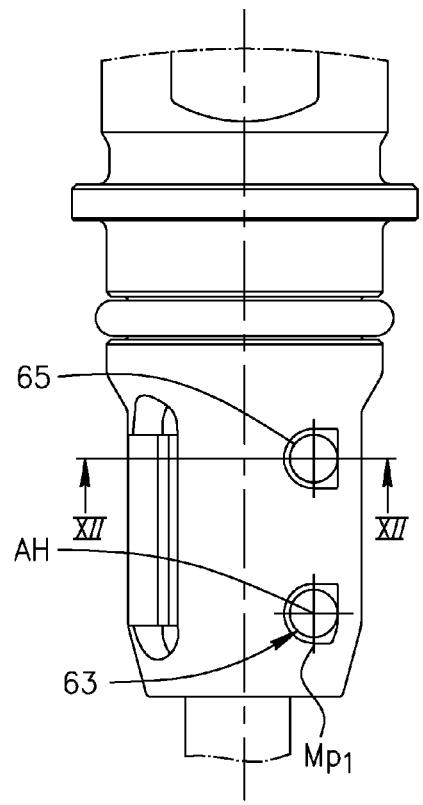
FIG. 11 is a side view of the cutting tool of FIG. 9 including a cutting insert and excluding a sleeve.
Figure 10:
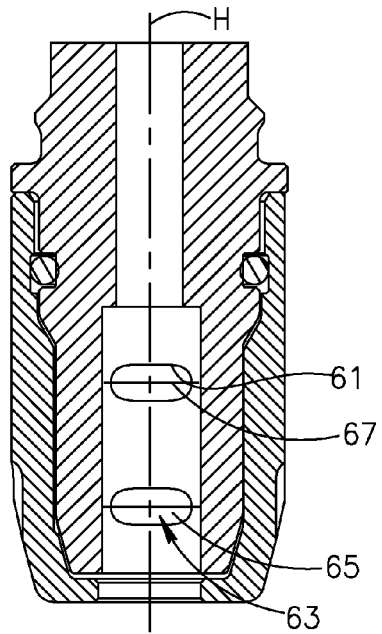
FIG. 10 is a cross-sectional view along line X-X of FIG. 9.
Figure 12:
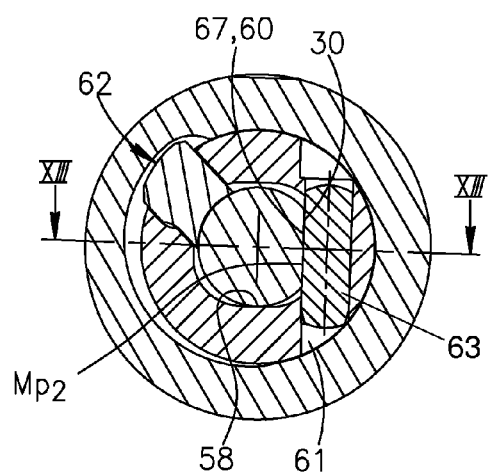
FIG. 12 is a cross-sectional view along line XII-XII of FIG. 11 including a sleeve.
Figure 13:
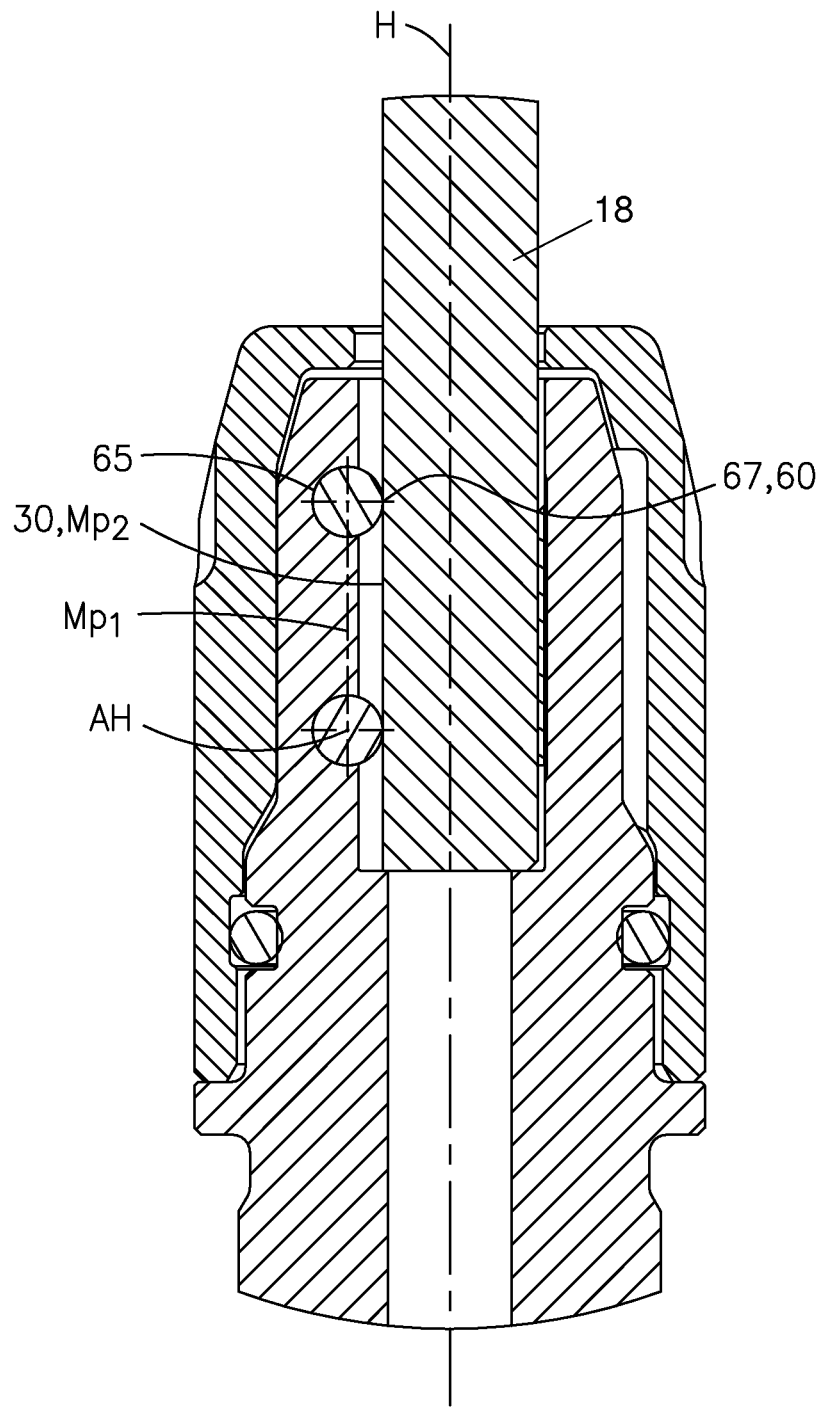
FIG. 13 is a cross-sectional view along line XIII-XIII of FIG. 12.

Securing the cutting insert 14 in the holder 12 is performed by rotating the clamping sleeve 42 from a released position of the cutting tool 10 (as shown in FIG. 5), to a secured position of the cutting tool 10 (as shown in FIGS. 6 and 7). As the clamping sleeve 42 is rotated from the released position to the secured position, force is applied by the clamping sleeve 42 on the load member 62 which in turn applies force to the cutting insert 14 on the cylindrical portion 28 of the cutting insert 14, which urges the cutting insert 14 against the minor and major abutment walls 58, 60.

When the cutting tool 10 reaches the secured position, the load member 62 is in clamping abutment with three surfaces: the second containing surface 66, the first portion 78 of the clamping sleeve 42 and the cylindrical portion 28 of the cutting insert 14. In this position, the cutting insert 14 is in clamping abutment with two other surfaces: the non-cylindrical portion 30 is in abutment with the major abutment wall 60 and the cylindrical portion 28 is in abutment with the minor abutment wall 58.

This abutment arrangement allows for a new cutting insert to be accurately positioned in the holder 12 when it replaces a worn cutting insert. Consequently, the cutting tip 20 of the new cutting insert 14 is also accurately positioned, with respect to the position of the worn cutting tip 20 of the old cutting insert 14.

The location of the insert shank 18 (and consequently the cutting tip 20) in a plane perpendicular to the holder axis H is generally determined by the minor and major abutment walls 58, 60. A more accurate determination of the location of the cutting tip 20 is achieved by the surface finish quality of both the cylindrical and non-cylindrical portions 28, 30 of the insert shank 18. However, since the cutting tool 10 cuts in a general direction perpendicular to the major abutment wall 60, the location accuracy of the cutting tip 20 in that direction is unimportant. Consequently, there is no need to invest in a high surface finish for the non-cylindrical portion 30 of the shank 18. Another way of defining the correct positioning of the cutting tip 20 is that the cutting tip 20 is always positioned in a plane which passes through the holder axis H and being perpendicular to the major abutment wall 60.

When the cutting tool 10 is in the released position, so that the insert shank 18 can be inserted into the cage 40, there is only one possible orientation of the insert shank 18 for which it can fit into the inner cage surface 44 of the cage 40. Only when the non-cylindrical portion 30 of the insert shank 18 faces the major abutment wall 60 will the insert shank 18 fit into the inner cage surface 44. Furthermore, only when the cutting tool 10 is in the released position, will the load member 62 have enough room to shift outwardly in a general direction away from the holder axis H, towards the inner sleeve surface 68, allowing the insert shank 18 to fit inside the inner cage surface 44. When the cutting tool 10 is in a released position the load member 62 is located in the region of the first portion 78 and no force is applied by the clamping sleeve 42 on the load member 62. The first portion 78 is formed to partially accommodate the load member 62 and to act as a torque-limiting stopper, preventing the point $P_2$ from passing, or climbing, over the load member 62 as the clamping sleeve 42 is rotated in the releasing direction D. In the released position, the load member 62 is in a released state, and is not necessarily simultaneously in abutment with all the three surfaces: the second containing surface 66, the second portion 80 of the clamping sleeve 42 and the cylindrical portion 28 of the cutting insert 14.

When the clamping sleeve 42 is turned in the direction opposite to the releasing direction D, since the second inner section 76 is capable of elastic deformation, point $P_3$ is able to pass over the farthest point of the load member 62 with respect to the holder axis H. Since point $P_3$ is located further from the holder axis H than the point $P_1$, the distance between the first portion 78 and the holder axis H decreases gradually. This leads then to a build up of pressure on the load member 62, proportional to the amount of turning of the clamping sleeve 42.

The present invention allows for a quick and easy method of inserting the cutting insert 14 in the holder shank 34 and securing it therein, and a correspondingly quick and easy method for replacement of the cutting insert 14. All it requires of an operator facing the task of installing the cutting insert 14 is to make sure that the clamping sleeve 42 is positioned in the released position, introduce the insert shank 18 into the cage 40 until the rear surface 24 of the cutting insert 14 abuts the stopper wall 59 of the cage 40; and rotate the clamping sleeve 42 in the direction opposite to the releasing direction D until the cutting tool 10 is in the secured position. The rotation of the clamping sleeve 42 can be done either by hand, or by means of a torque transferring tool, such as a dedicated wrench. When the operator is required to replace a worn cutting insert 14, the method is very similar to the insertion method. The operator has to rotate the clamping sleeve 42 in the releasing direction D until the cutting tool 10 is in the released position, remove the worn cutting insert 14 from the cage 40 and then insert the new cutting insert as described above.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

The invention claimed is:

1. A cutting tool (10) comprising a cutting insert (14) and a holder (12), the holder (12) having a longitudinal holder axis (H) and comprising:
 a holder shank (34) and a clamping portion (32), the clamping portion (32) comprising a clamping sleeve (42) and a cage (40) located within the clamping sleeve (42), the clamping sleeve (42) having a longitudinal sleeve axis (S) defining a releasing direction (D), the cage (40) comprising
 at least one load member housing (48) having a load member (62) accommodated therein,
 inner and outer cage surfaces (44), (46), the inner cage surface (44) comprising a stopper wall (59) transverse to the holder axis H, and
 adjacent minor and major abutment walls (58, 60), each extending along the holder axis (H);
 the clamping sleeve (42) having inner and outer sleeve surfaces (68, 70), the inner sleeve surface (68) comprising first and second inner sections (74, 76) extending over a given length parallel to the sleeve axis (S) and defined by points $P_1$ and $P_2$ in a cross section taken perpendicular to the sleeve axis (S); a point $P_3$ further from the sleeve axis (S) than the points $P_1$ and $P_2$ divides the second inner section (76) into first and second portions (78, 80);

the cutting insert (14) having an insert axis B and comprising an insert shank (18) and a cutting portion (16), the insert shank (18) having a peripheral surface (26) comprising a cylindrical portion (28) and a non-cylindrical portion (30), the cutting portion (16) having a cutting tip (20) which includes at least one cutting edge (22);

characterized in that, the clamping sleeve (42) is rotatable between a secured and a released position of the cutting tool (10);

in the released position the load member (62) is positioned between the second portion (80) and the holder axis (H);

in the secured position, the load member (62) is positioned between the first portion (78) and the holder axis (H), the non-cylindrical portion (30) abuts the major abutment wall (60), the cylindrical portion (28) abuts both the minor abutment wall (58) and the load member (62), and the load member (62) abuts the first portion (78).

2. The cutting tool (10) according to claim 1, wherein the major abutment wall (60) is discontinuous.

3. The cutting tool (10) according to claim 1, wherein the cage (40) comprises at least two pins (63) located in respective pin holes (61) in the cage (40), which open out to the inner and outer cage surfaces (44), (46).

4. The cutting tool (10) according to claim 3, wherein the pins (63) have a cylindrical peripheral surface (65).

5. The cutting tool (10) according to claim 1, wherein the major abutment wall (60) is constituted by at least two strips (67).

6. The cutting tool (10) according to claim 1, wherein the load member housing (48) comprises a delimiting abutment surface (66) and, in a secured position, the load member (62) abuts both the delimiting abutment surface (66) and the first portion (78) of the clamping sleeve (42).

7. The cutting tool (10) according to claim 1, wherein the load member (62) has a cylindrical shape.

8. The cutting tool (10) according to claim 1, wherein the cage (40) opens out axially forwardly and through the load member housing (48).

9. The cutting tool (10) according to claim 1, wherein the outer cage surface (46) has a generally cylindrical shape.

10. The cutting tool (10) according to claim 1, wherein part of the inner cage surface (44) comprises a surface generally complementary in shape to the cylindrical portion (28) of the insert shank (18).

11. The cutting tool (10) according to claim 1, wherein the minor abutment wall (58) is flat and perpendicular to the major abutment wall (60).

12. The cutting tool (10) according to claim 1, wherein the first inner section (74) of the clamping sleeve (42) is cylindrical in shape.

13. The cutting tool (10) according to claim 1, wherein the first inner section (74) of the clamping sleeve (42) is larger than the second inner section (76).

14. The cutting tool (10) according to claim 1, wherein the first and second portions (78, 80) have given arc lengths taken in a cross section perpendicular to the sleeve axis (S), the arc length of the first portion (78) being longer than the arc length of the second portion (80).

15. The cutting tool (10) according to claim 1, wherein when the cutting tool (10) is transferred from a released position to a secured position, the point $P_3$ passes over a farthest portion of the load member (62) from the holder axis (H).

16. The cutting tool (10) according to claim 1, wherein the minor abutment wall (58) is discontinuous.

17. The cutting tool (10) according to claim 1, wherein the load member (62) has a non-cylindrical shape.

18. A holder (12) having a longitudinal holder axis (H) and comprising:

a holder shank (34) and a clamping portion (32), the clamping portion (32) comprising a clamping sleeve (42) having a longitudinal sleeve axis (S) defining a releasing direction (D) and a cage (40) located within the clamping sleeve (42), the cage (40) comprising at least one load member housing (48) having a load member (62) accommodated therein, inner and outer cage surfaces (44), (46), the inner cage surface (44) comprising a stopper wall (59) transverse to the holder axis H; and adjacent minor and major abutment walls (58, 60), each extending along the holder axis (H);

the clamping sleeve (42) having inner and outer sleeve surfaces (68, 70), the inner sleeve surface (68) comprising first and second inner sections (74, 76) extending over a given length parallel to the sleeve axis (S) and defined by points $P_1$ and $P_2$ in a cross section taken perpendicular to the sleeve axis (S); a point $P_3$ further from the sleeve axis (S) than the points $P_1$ and $P_2$ divides the second inner section (76) into first and second portions (78, 80).

19. The holder (12) according to claim 18, wherein the major abutment wall (60) is discontinuous.

20. The holder (12) according to claim 18, wherein the cage (40) comprises at least two pins (63) located in respective pin holes (61) in the cage (40), which open out to the inner and outer cage surfaces (44), (46).

21. The holder (12) according to claim 20, wherein the pins (63) have a cylindrical peripheral surface (65).

22. The holder (12) according to claim 18, wherein the major abutment wall (60) is constituted by at least two strips (67).

23. The holder (12) according to claim 18, wherein the load member housing (48) comprises a delimiting abutment surface (66) and, in a secured position, the load member (62) abuts both the delimiting abutment surface (66) and the first portion (78) of the clamping sleeve (42).

24. The holder (12) according to claim 18, wherein the load member (62) has a cylindrical shape.

25. The holder (12) according to claim 18, wherein the cage (40) opens out axially forwardly and through the load member housing (48).

26. The holder (12) according to claim 18, wherein the outer cage surface (46) has a generally cylindrical shape.

27. The holder (12) according to claim 18, wherein part of the inner cage surface (44) comprises a surface generally complementary in shape to the cylindrical portion (28) of the insert shank (18).

28. The holder (12) according to claim 18, wherein the minor abutment wall (58) is flat and perpendicular to the major abutment wall (60).

29. The holder (12) according to claim 18, wherein the first inner section (74) of the clamping sleeve (42) is cylindrical in shape.

30. The holder (12) according to claim 18, wherein the first inner section (74) of the clamping sleeve (42) is larger than the second inner section (76).

31. The holder (12) according to claim 18, wherein the first and second portions (78, 80) have given arc lengths taken in a cross section perpendicular to the sleeve axis (S), the arc length of the first portion (78) being longer than the arc length of the second portion (80).

32. The holder (12) according to claim 18, wherein the minor abutment wall (58) is discontinuous.

33. The holder (12) according to claim 18, wherein the load member (62) has a non-cylindrical shape.

\* \* \* \* \*